(12) United States Patent
Emura et al.

(10) Patent No.: US 9,738,316 B2
(45) Date of Patent: Aug. 22, 2017

(54) VEHICLE BODY STRUCTURE

(71) Applicant: HONDA MOTOR CO., LTD., Tokyo (JP)

(72) Inventors: Masahiko Emura, Saitama (JP); Yuichi Kondo, Saitama (JP); Masato Wakai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/916,033

(22) PCT Filed: Aug. 1, 2014

(86) PCT No.: PCT/JP2014/070378
§ 371 (c)(1),
(2) Date: Mar. 3, 2016

(87) PCT Pub. No.: WO2015/033716
PCT Pub. Date: Mar. 12, 2015

(65) Prior Publication Data
US 2016/0214649 A1  Jul. 28, 2016

(30) Foreign Application Priority Data
Sep. 4, 2013 (JP) .................... 2013-182652

(51) Int. Cl.
*B62D 21/02* (2006.01)
*B62D 25/04* (2006.01)
(Continued)

(52) U.S. Cl.
CPC ............ *B62D 21/02* (2013.01); *B62D 25/04* (2013.01); *B62D 25/06* (2013.01); *B62D 27/023* (2013.01)

(58) Field of Classification Search
CPC ...... B62D 25/04; B62D 25/06; B62D 27/023; B60J 10/84; B60R 13/06
(Continued)

(56) References Cited

U.S. PATENT DOCUMENTS 7,121,615 B2 * 10/2006 Hoshino ............... B62D 25/06
296/187.12
7,431,378 B2 * 10/2008 Chen ..................... B62D 25/06
296/102
(Continued)

FOREIGN PATENT DOCUMENTS

JP   58-149866    9/1983
JP   2-117263     9/1990
(Continued)

OTHER PUBLICATIONS

International Search Report dated Oct. 21, 2014, Application No. PCT/JP2014/070378.
(Continued)

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

Provided is a vehicle body structure including: a left-right pair of roof side rails extending in a front-rear direction of a vehicle body; a pillar extending in an upper-lower direction, an upper end of the pillar being joined to an interior side surface of the corresponding roof side rail; and a roof arch extending in a vehicle transverse direction, left and right side end portions thereof being joined to the interior side surfaces of the roof side rails.

5 Claims, 3 Drawing Sheets

(51) Int. Cl.
*B62D 25/06* (2006.01)
*B62D 27/02* (2006.01)

(58) Field of Classification Search
USPC ........... 296/193.06, 210, 203.01, 209, 146.9, 296/193.05, 29, 30
See application file for complete search history.

(56) References Cited

U.S. PATENT DOCUMENTS

| | | | | |
|---|---|---|---|---|
| 7,963,591 | B2* | 6/2011 | Duguet | B62D 25/04 296/203.03 |
| 8,109,561 | B2* | 2/2012 | Matsumura | B62D 25/04 296/193.05 |
| 8,109,562 | B2* | 2/2012 | Yu | B62D 25/06 296/187.13 |
| 2012/0126582 | A1 | 5/2012 | Kishi | |
| 2014/0152053 | A1* | 6/2014 | Watanabe | B62D 25/02 296/193.06 |
| 2014/0354012 | A1 | 12/2014 | Nagai et al. | |

FOREIGN PATENT DOCUMENTS

| | | |
|---|---|---|
| JP | 2006-111130 | 4/2006 |
| JP | 2007-069667 | 3/2007 |
| JP | 2009-298335 | 12/2009 |
| JP | 2012-076616 | 4/2012 |
| JP | 2012-106706 | 6/2012 |
| JP | 2013-144501 | 7/2013 |
| WO | 2012-168612 | 12/2012 |
| WO | 2013/099456 | 7/2013 |

OTHER PUBLICATIONS

Japanese Office Action dated Aug. 2, 2016.
Chinese Office Action dated Dec. 16, 2016, 6 pages.
European Office Action dated Apr. 17, 2017, 7 pages.

* cited by examiner

VEHICLE BODY STRUCTURE

TECHNICAL FIELD

The present invention relates to a vehicle body structure of an automobile or the like.

BACKGROUND ART

As a conventional example of a technology for joining a roof arch extending in a vehicle transverse direction to a roof side rail extending in a vehicle body front-rear direction, a technology described in Patent Literature 1 can be taken. In Patent Document 1, described is a technology for joining a roof arch (roof bow) to a roof side rail by mounting the roof arch from an upper side for a purpose of improving the attaching work of the roof arch.

Further, as conventional examples of technologies for joining a pillar extending in the upper-lower direction together with a roof arch to a roof side rail, technologies described in Patent Literatures 2 and 3 can be taken. In Patent Literature 2, described is a technology for joining a roof arch (roof rail) and respective inner members (side inner members), which are a pillar and a roof side rail, through a gusset. This gusset is provided with an anti-drop portion and an anti-deviation portion, by which positioning in attaching or assembling is made easy and the gusset is prevented from dropping.

In Patent Literature 3, described is a technology for forming click portions at the front and rear end portions of a gusset and forming beads between these paired click portions. According to this technology, opening portions for stopping the click portions are offset in the front-rear direction, and the load transmission efficiency is improved by the beads. Further, a technology is described for preventing a pillar garnish from moving off in expanding a side curtain air bag, by engaging a stop convex portion at the upper end of a pillar garnish to a bead.

RELATED ART DOCUMENTS

Patent Literatures

Patent Literature 1: JP S58-149866 A
Patent Literature 2: JP 2009-298335 A
Patent Literature 3: JP 2012-106706 A

DISCLOSURE OF THE INVENTION

Problems to be Solved by the Invention

In the technology in Patent Literature 1, adopted is a structure in which the cross-section of an end portion of a roof arch is crushed so as to mount a roof arch on a roof side rail. The crushed portion decreases the strength and stiffness around a joint portion. If the strength and the stiffness around the joint portion are decreased, the restricting force against noises and vibrations is sometimes decreased or the deformation amount of the interior space sometimes becomes large if a side impact, a roll over, or the like has occurred.

The technology in Patent Literature 2 has problems as follows.
(1) As the structure requires a gusset for reinforcing, the number of components increases, and the weight increases.
(2) Compared with a structure in which a roof arch and a pillar are directly connected, the efficiency of load transmission decreases, and the stiffness and the strength around a joint portion correspondingly decreases.
(3) In order to increase the stiffness and the strength, it is necessary to make the thicknesses of members, such as the roof arch, the pillar, the gusset, or add a reinforcing member, which increases the weight.
(4) As it is necessary to provide to the roof arch and the side inner members with the opening portions (a stop portion and an engaging portion described in the literature) for stopping the anti-drop portion and the anti-deviation portion. Accordingly, these opening portions decrease the stiffness and the strength. Particularly, the portion where the gusset is arranged is a portion where the roof arch, the roof side rail, and the pillar intersect with each other, and the required stiffness and the required strength are large. Accordingly, it is necessary to compensate for the decrease in the stiffness and the strength due to the opening portions, by making the plate thicknesses large or adding a reinforcing member. The weight correspondingly increases.
(5) Although not shown in Patent Literature 2, on the interior side of the roof side rail and the gusset, there are sometimes attached a side curtain airbag and a roof lining and a pillar garnish, which are interior members covering the interior side of the side curtain airbag. When this specification is adopted, a structure is often used in which the upper end of the pillar garnish is stopped by a click to the roof lining. However, with this structure, when the side curtain airbag is expanded, the pillar garnish may move off by the shock of the expansion and flies out into the interior side, which is a problem that cannot be solved by the technology described in Patent Literature 2.

In the technology of Patent Literature 3, although the load transmission efficiency is improved by forming a bead, the problems still remain that the number of components increases because of the structure requiring a gusset and the weight thereby increases, which is the above described problem (1), and that the load transmission efficiency tends to decrease compared with a structure in which a roof arch and a pillar are directly connected, which is the above described problem (2). Further, a technology for engaging a stop convex portion of a pillar garnish to a bead has the following problem. That is, in engaging the stop convex portion to the bead, the stop convex portion is to be inserted in a state the pillar garnish is oblique to the pillar, in other words, the stop convex portion is oblique to an extended space inside the bead, so that the pillar garnish does not contact the pillar. In this situation, if the space inside the bead is narrow, the stop convex portion and the side guide rail member, on the vehicle exterior side, of the gusset interfere with each other so that the workability of attaching work is sometimes lowered. In order to prevent this interference, providing an opening portion on the side rail member is considered so as to move off the stopping convex portion in inserting the stop convex portion. However, providing an opening portion makes the stiffness and the strength of the roof side rail easily decrease.

The present invention has been developed in order to solve the above described problems, and an object of the invention is to provide a vehicle body structure enabling both ensuring the stiffness and the strength around a joint portion of a pillar and a roof arch and restricting an increase in a vehicle body weight by decreasing the number of components.

Means for Solving the Problems

In order to Solve the above described problems, according to the invention, a vehicle body structure includes: a left-right pair of roof side rails extending in a front-rear direction of a vehicle body; a pillar extending in an upper-lower direction, an upper end of the pillar being joined to an interior side surface of the corresponding roof side rail; a roof arch extending in a vehicle transverse direction, left and right side end portions thereof being joined to the interior side surfaces of the roof side rails, wherein the pillar includes a pillar bead extending in the upper-lower direction and protruding from an interior to an exterior of a vehicle compartment, wherein the roof arch includes a roof bead extending in the left-right direction and protruding from the interior to the exterior of the vehicle compartment, and wherein the pillar and the roof arch are joined with each other such that the pillar bead is overlapped with the roof bead in the interior-exterior direction of the vehicle compartment.

With this vehicle body structure, as beads with high stiffness and strength are formed continuously from each other, the load transmission efficiency from a pillar to a roof arch increases. As the pillar and the roof arch are directly joined in the structure, the load transmission efficiency is higher compared with a conventional structure, which requires a gusset. Accordingly, the stiffness and strength of the overlap portion of the pillar and the roof arch increases, and the noise and vibration characteristics and the anti-impact characteristic can be improved. Further, while satisfaction of these characteristics is attained, the weight of the vehicle body can be decreased by making the plate thicknesses of members small and removing a gusset or other reinforcing members.

Further, according to the invention, a plurality of the pillar beads and the roof bead are provided at a certain interval in the front-rear direction of the vehicle body, and the each pillar bead and the each roof bead are disposed such as to overlap each other in the interior-exterior direction of the vehicle compartment.

With this vehicle body structure, the number of edge lines forming the beads increases, the stiffness and strength at the overlap portion of the pillar and the roof arch can be further improved.

Still further, according to the invention, joint portions are provided each of which joins the corresponding pillar and the roof arch such as to sandwich the pillar bead and the roof bead in the front-rear direction of the vehicle body.

According to this vehicle body structure, as the load transmission between the pillar and the roof arch is made through the joint portion of these two, the stiffness and strength at the overlap portion of the pillar and the roof arch can be further improved by providing this joint portion at a portion sandwiching the pillar bead and the roof bead with high stiffness and strength.

Yet further, according to the invention, the each joint portion includes a spot welding portion for three pieces that are the corresponding roof side rail, pillar, and roof arch.

With this vehicle body structure, it is possible to improve by a simple structure the stiffness and strength of the overlap portion of the three components, which are the roof side rail, the pillar, and the roof arch.

Further, according to the invention, the vehicle body structure includes: pillar garnishes covering interior side surfaces of the pillars, wherein the roof arch is joined to the interior side surfaces of the pillars, wherein the roof bead is arranged such that a protruding amount thereof to interior side of the vehicle compartment is set larger than a protruding amount of the each pillar bead to the interior side of the vehicle compartment, wherein the roof bead is overlapped with the interior side surface of the each pillar bead so that a closed cross-sectional portion is formed between the roof bead and the each corresponding pillar bead, and wherein the each pillar garnish includes at an upper end thereof a stop portion that is stopped by being inserted into the closed cross-sectional portion.

With this vehicle body structure, the stiffness and strength of the overlap portion can be increased by the closed cross-sectional portion formed by overlapping the pillar bead with the roof bead. Further, by stopping the stop portion of the pillar garnish to this closed cross-sectional portion, it is not necessary to provide an opening portion (in Patent Literature 2, the opening portion for stopping the anti-drop portion of the gusset, and in Patent Literature 3, the opening portion for moving off the stopping convex portion), which was conventionally necessary. Accordingly, the stiffness and the strength of the overlap portion of the pillar and the roof arch can be more increased. Further, as the stop portion is stopped by the closed cross-sectional portion with high stiffness and strength, the stop force of the pillar garnish is increased. Thus, when the side curtain airbag expands, the pillar garnish hardly moves off.

Still further, according to the invention, a plurality of the pillar beads, the roof beads, and the stop portions are provided at a certain interval in the front-rear direction of the vehicle body; the pillar beads are overlapped with the corresponding roof beads respectively in the interior-exterior direction of the vehicle compartment to thereby form a plurality of the closed cross-sectional portions; and the respective stop portions are stopped by the corresponding closed cross-sectional portions.

With this vehicle body structure, the number of edge lines forming the beads increases, the stiffness and strength at the overlap portion of the pillar and the roof arch can be improved. Further, as a plurality of the closed cross-sectional portions and a plurality of the stop portions are provided, a load applied to the respective stop portions can be dispersed when the side curtain airbag expands. The respective stop portions can be correspondingly downsized. Accordingly, the closed cross-sectional portions can be prevented from becoming large so that the degree of freedom of layout of the pillar beads and the roof beads is increased, while it is not necessary to provide opening portions for moving off to avoid interference with the stop portions. It is possible to correspondingly maintain the stiffness and the strength of the overlap portion of the pillar and the roof arch.

Advantage of the Invention

According to the present invention, it is possible to ensure the stiffness and the strength around a joint portion of a pillar and a roof arch, and inhibit an increase in a vehicle body weight by decreasing the number of components.

EMBODIMENT FOR CARRYING OUT THE INVENTION

Figure 1:
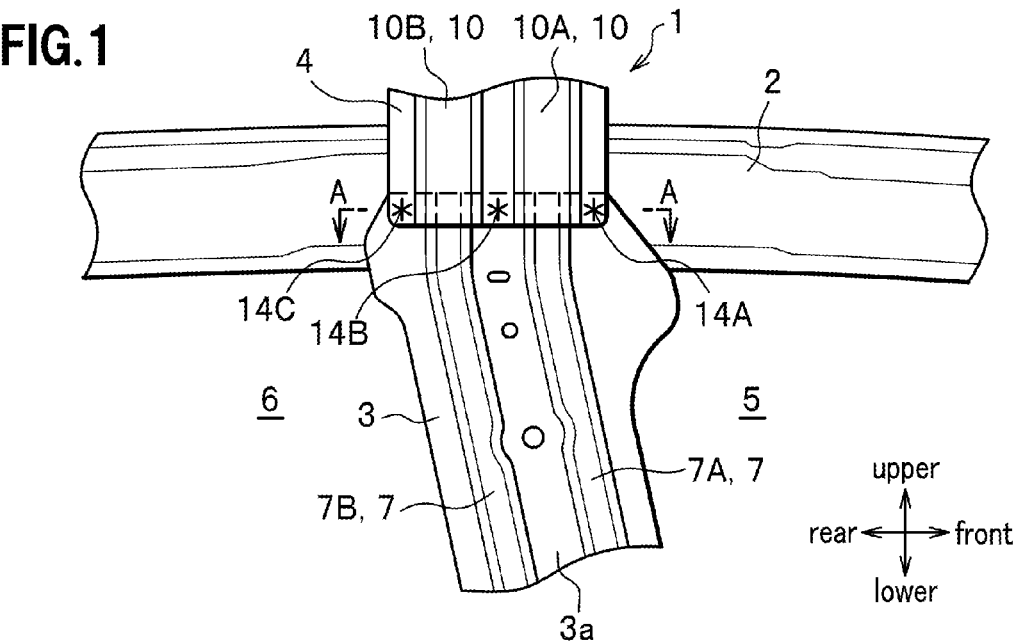
FIG. 1 is a side view showing a vehicle body structure according to the present invention and shows a part on the left side of a vehicle body.
Figure 2:
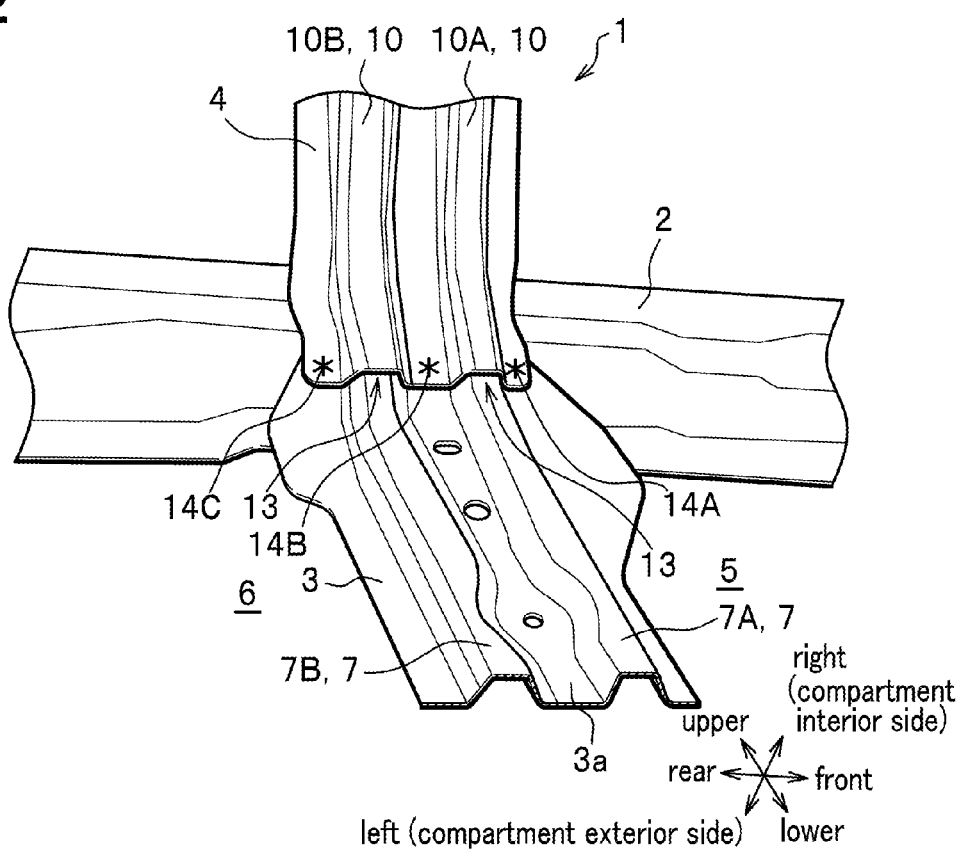
FIG. 2 is an appearance perspective view of the vehicle body structure according to the present invention in a state of being viewed up from the interior side.

In FIG. 1 and FIG. 2, a vehicle body structure 1 is provided with a left-right pair of roof side rails 2 (only a roof side rail on the left side being shown in FIG. 1) extending in the front-rear direction of the vehicle body, pillars 3, whose upper ends are joined with interior side surfaces (one of which being the side surface facing the front of the sheet in FIG. 1) of the roof side rail 2, the pillars 3 extending in the upper-lower direction, and roof arches 4, whose left and right end portions are joined with the interior side surfaces of the roof side rails 2, the roof arches 4 extending in the vehicle transverse direction. The vehicle body structure 1 can be applied to a passenger car and a truck, a working car, etc. as well.

In the vehicle body structure 1 for a passenger car, in general, plural roof arches 4 are arranged at intervals and in parallel to each other in the vehicle body front-rear direction. The pillars 3 are, for example, center pillars, which form front door opening portions 5 and rear door opening portions 6 by partitioning, each of the pillars 3 being joined with one of the plural roof arches 4. Each of the roof side rails 2, the pillars 3, and the roof arches 4 is formed by a pressed steel plate or the like. Incidentally, the roof side rails 2 and the pillars 3 are members on the inner side out of two structures divided respectively in the interior and exterior direction of the vehicle compartment. An inner frame is formed by joining three components, which are a roof side rail 2, a pillar 3, and a roof arch 4. To this inner frame, an outer roof side rail and an outer pillar (neither shown) on the outer side are joined from the vehicle exterior side.

[Pillar 3]

Each of the pillars 3 is arranged such that a base plate portion 3a thereof substantially in a flat plate is provided with a pillar bead 7 extending along the longitudinal direction of the base plate portion 3a, in other words, in the upper-lower direction, and protruding from an interior to an exterior of a vehicle compartment. In the present invention, plural pillar beads 7 (in the example, at two positions, and are represented by symbols 7A and 7B) in the vehicle body front-rear direction at certain intervals. The pillar beads 7A, 7B are extending in the upper-lower direction substantially in parallel to each other. Incidentally, the periphery of the upper end of the pillar 3 is bent being a little biased to the center of the vehicle body in the left-right direction so as to be joined with the periphery of an end portion of the roof arch 4.

Figure 3:
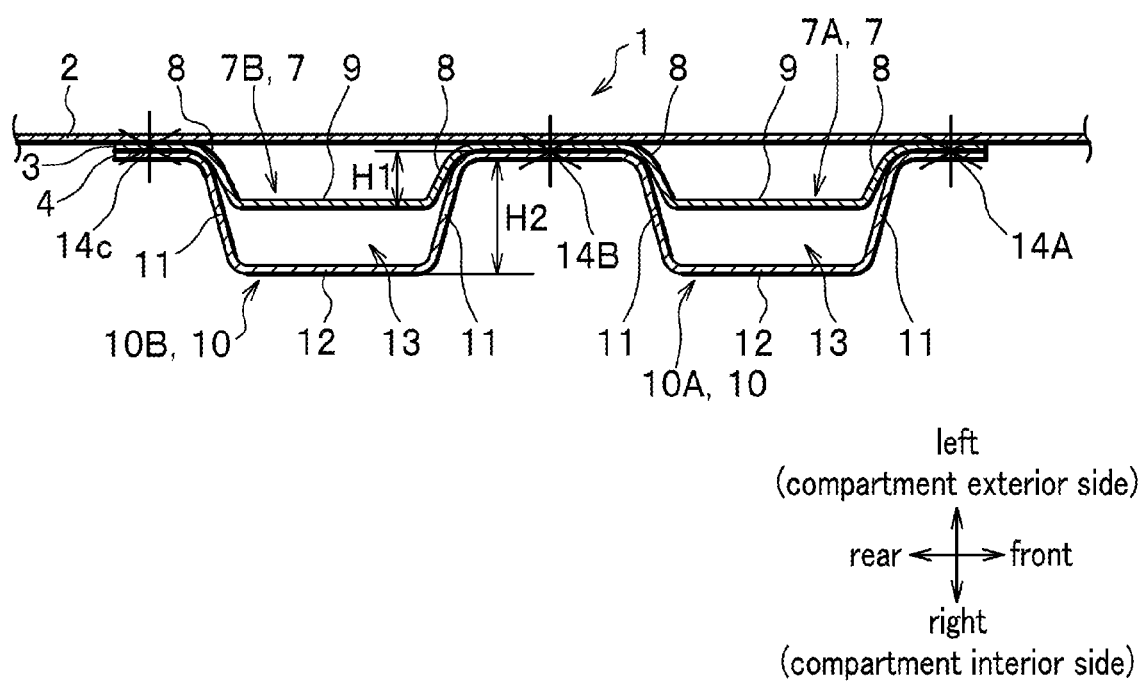
FIG. 3 is an A-A cross-sectional view in FIG. 1.

As shown in FIG. 3, a pillar bead 7A and a pillar bead 7B in the present embodiment are both protruding from the base plate portion 3a to the vehicle interior side. Each of the pillar beads 7A, 7B are provided with a pair of side surface portions 8 obliquely standing from the base plate portion 3a and a bottom surface portion 9 that is in a flat surface shape substantially in parallel with the base plate portion 3a and distant from the base plate portion 3a by a protruding dimension H1, and has a cross-section substantially in a trapezoid shape. Incidentally, the respective protruding dimensions H1 of the pillar beads 7A, 7B may be set to be different from each other.

[Roof Arch 4]

Each roof arch 4 is arranged such that a base plate portion 4a thereof substantially in a flat plate shape is provided with a roof bead 10 that extends along the longitudinal direction of the base plate portion 4a, in other words, the left-right direction and protrudes from the interior to the exterior of the vehicle compartment. In the present embodiment, plural roof beads 10 are provided (in the example, at two positions and represented by symbols 10A, 10B) at a certain interval (the same as the interval between the pillar beads 7A, 7B) in the vehicle body front-rear direction. The roof beads 10A, 10B extend in the left-right direction substantially in parallel to each other. The periphery of an end portion of the roof arch 4 is bent downward a little so that this periphery is joined with the periphery of an upper end of the pillar 3.

As shown in FIG. 3, both the roof beads 10A, 10B in the present embodiment are protruded from the base plate portion 4a to the interior side of the vehicle. Each of the roof beads 10A, 10B are provided with a pair of side surface portions 11 obliquely standing from the base plate portion 4a and a bottom surface portion 12 that is in a flat surface shape substantially in parallel with the base plate portion 4a and distant from the base plate portion 4a by a protruding dimension H2, and has a cross-section substantially in a trapezoid shape. Incidentally, the respective protruding dimension H2 is set larger than the protruding dimension H1.

The each pillar 3 and the each roof arch 4 with the above described structures are joined with each other such that the pillar bead 7 and the roof bead 10 overlap each other in the interior-exterior direction of the vehicle compartment. As a result, the pillar beads 7A, 7B and the roof beads 10A, 10B, which are arranged at a certain interval in the front-rear direction of the vehicle body, are disposed such as to respectively overlap each other in the interior-exterior direction of the vehicle. As the protruding dimension H2 of the roof beads 10 is larger than the protruding dimension H1 of the pillar beads 7, a closed cross-sectional portion (closed cross-sectional space) 13 is formed between the each pillar bead 7 and roof bead 10. In forming the closed cross-sectional portion 13, the side surface portion 8 of the pillar bead 7 and the side surface portion 11 of the roof bead 10 may be separated from each other as shown in FIG. 3, or may be made in contact with each other.

In the present embodiment, the roof arch 4, the pillar 3, and the roof side rail 2 are overlapped each other in this order. Concretely, as shown in FIG. 3, the base plate portion 3a of the pillar 3 is formed being divided in totally three portions which are a central portion located between the pillar beads 7A and 7B by the existence of the two pillar beads 7A, 7B, and a pair of edge portions located on the respective outer sides of the pillar beads 7A, 7B. Likewise, the base plate portion 4a of the roof arch 4 is also formed being divided in totally three portions which are a central portion located between the roof beads 10A, 10B by the existence of the roof beads 10A, 10B, and a pair of edge portions located on the respective exterior sides of the roof beads 10A, 10B. The pillar 3 and the roof arch 4 are overlapped with the roof side rail 2 in a state that the base plate portions 3a and the base plate portions 4a, which are respectively divided three parts, are in contact with each other. The three components, which are the pillar 3, the roof arch 4, and the roof side rail 2, are joined by spot welding. The spot welding portions at the three positions will be referred to as joint portions and represented by symbols 14A to 14C.

As described above, the pillar 3 is provided with the pillar beads 7 extending in the upper-lower direction and protruding from the interior to the exterior of the vehicle compartment, and the roof arch 4 is provided with the roof beads 10 extending in the left-right direction and protruding from the interior to the exterior of the vehicle. In such a manner, if a structure is adopted in which the pillar 3 and the roof arch 4 are joined with each other such that the pillar beads 7 and the roof beads 10 overlap each other, the following advantages will be obtained. First, as the beads with high stiffness and strength are formed continuously with each other, the load transmission efficiency from the pillar 3 to the roof arch 4 increases. In this structure, as the pillar 3 and the roof arch 4 are directly joined, the load transmission efficiency is of course excellent also in this respect, compared with a conventional structure which requires a gusset. Accordingly, the stiffness and the strength of the overlapping portion of the pillar 3 and the roof arch 4 increases, and it is possible to improve the noise and vibration characteristics and the anti-side-impact characteristic (mainly the anti-side-impact characteristic). Further, in addition to satisfying these characteristics, it is possible to decrease the weight of the vehicle body by making the plate thicknesses of members small and removing gusset or other reinforcing members.

Further, by providing plural pillar beads 7 and plural roof beads 10 in the vehicle body front-rear direction at certain intervals and disposing the respective pillar beads 7A, 7B and the respective roof beads 10A, 10B such as to overlap each other in the interior-exterior direction of the vehicle compartment, as the number of edge lines (bending lines) increases, the stiffness and the strength of the overlap portions of the pillars 3 and the roof arches 4 can be further increased.

Further, by providing a joint portion (which is spot welding portions 14A and 14B for the pillar bead 7A and the roof bead 10A, and is spot welding portions 14B and 14C for the pillar bead 7B and the roof bead 10B) for joining the pillar 3 and the roof arch 4 such as to sandwich the pillar bead 7 and the roof bead 10, the following advantage can be obtained. That is, as the load transmission between the pillar 3 and the roof arch 4 is made through the joint portions between these two, by arranging these joint portions at positions with high stiffness and strength sandwiching the pillar beads 7 and the roof beads 10, the stiffness and the strength of the overlap portion of the pillar 3 and the roof arch 4 can be further improved.

Further, by forming the joint portion of the pillar 3 and the roof arch 4 by the three spot welding portions 14A to 14C of the roof side rail 2, the pillar 3, and the roof arch 4, the stiffness and the strength of the overlap portion of the three components, which are the roof side rail 2, the pillar 3, and the roof arch 4, can be improved.

[Pillar Garnish 15]

Figure 4:
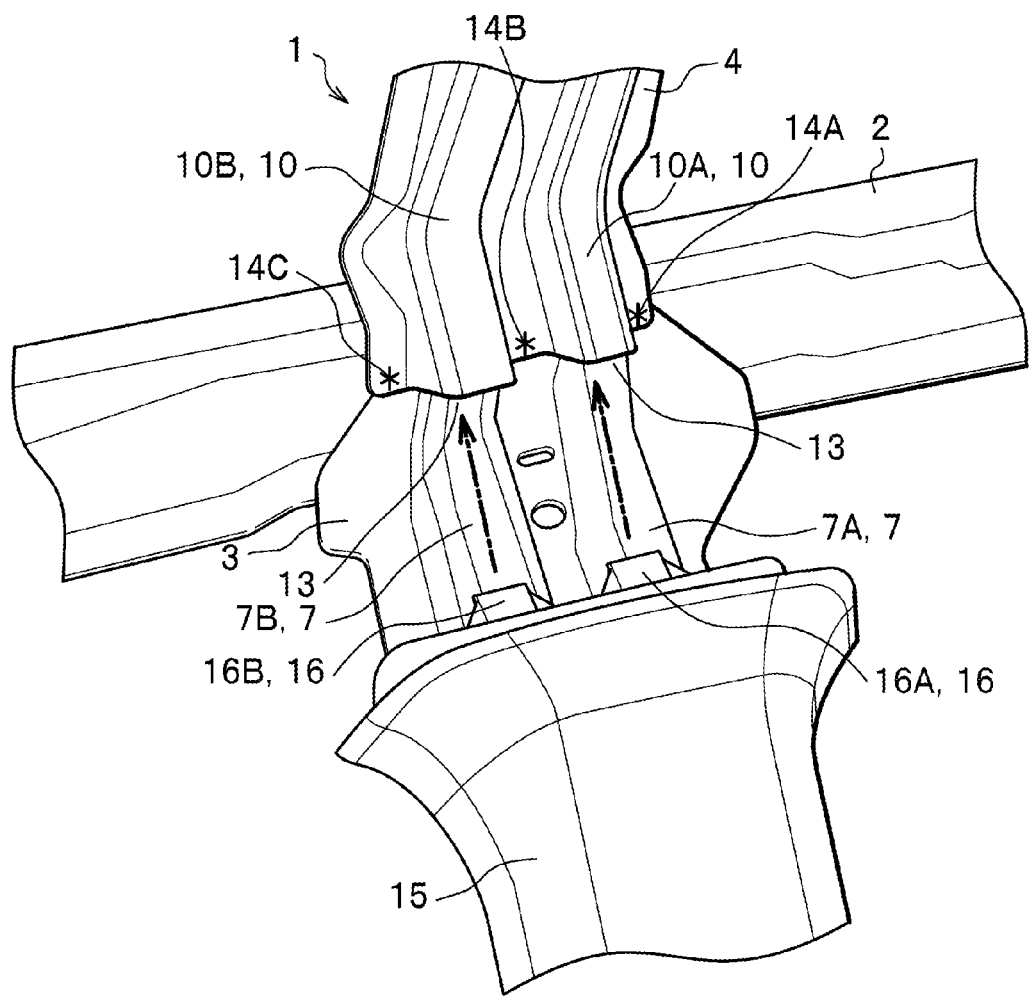
FIG. 4 is an appearance perspective view of the vehicle body structure according to the present invention in a state of being viewed up from the interior side, showing a state of attaching a pillar garnish.
Figure 4:
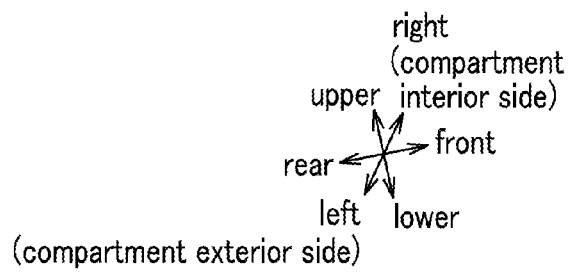

A pillar garnish 15 is attached, as shown in FIG. 4, to the inner frame formed by joining the three components, which are the roof side rail 2, the pillar 3, and the roof arch 4. Between the pillar 3 and the pillar garnish 15, there is provided for example a side curtain airbag (not shown). The pillar garnish 15 is an interior member of the vehicle compartment formed from a synthetic resin material or the like, and is attached such as to cover the interior side surface of the pillar 3. The pillar garnish 15 is integrally provided at the upper end thereof with a stop portion 16 stopped by the pillar 3 by being inserted into the closed cross-sectional portion 13 from the end portion of the roof arch 4. The stop portions 16 are constructed by a stop portion 16A inserted into the closed cross-sectional portion 13 formed by the pillar bead 7A and the roof bead 10A, and a stop portion 16B inserted into the closed cross-sectional portion 13 formed by the pillar bead 7B and the roof bead 10B.

As described above, in the vehicle body structure provided with the pillar garnish 15 covering the interior side surface of the pillar 3, as described above, the roof arch 4 is joined to the interior side surface of the pillar 3; the protruding amount (protruding dimension H2) of the roof bead 10 toward the vehicle interior side is set larger than the protruding amount (protruding dimension H1) of the pillar bead 7 toward the interior side surface; the roof bead 10 is thus overlapped with the interior side surface of the pillar bead 7 to form the closed cross-sectional portion 13; and the pillar garnish 15 is provided at the upper end thereof with the stop portion 16 stopped by being inserted into the closed cross-sectional portion 13. By this structure, the following advantage can be obtained.

By the closed cross-sectional portion 13 formed by overlapping the pillar bead 7 and the roof bead 10 each other, the stiffness (particularly the torsional stiffness) and the strength of the overlap portion can be increased. Further, by stopping, at the closed cross-sectional portion 13, the stop portion 16 of the pillar garnish 15, it is not necessary to provide an opening portion (in Patent Literature 2, the opening portion for stopping the anti-drop portion of the gusset, and in Patent Literature 3, the opening portion for moving off the stopping convex portion), which was conventionally necessary. Accordingly, the stiffness and the strength of the overlap portion of the pillar 3 and the roof arch 4 can be more increased. Further, as the stop portion 16 is stopped by the closed cross-sectional portion 13 with high stiffness and strength, the stop force of the pillar garnish 15 is increased. Thus, even when the side curtain airbag expands, the pillar garnish 15 hardly moves off.

Further, a plurality of the pillar beads 7, the roof bead 10, and the stop portion 16 are provided in front-rear direction of the vehicle body at a certain interval, and the respective pillar beads 7A, 7B and the roof beads 10A, 10B are overlapped each other in the interior-exterior direction of the vehicle compartment. Thus, plural closed cross-sectional portions 13 are formed, and the stop portions 16A, 16B are respectively stopped by the respective closed cross-sectional portions 13. By this structure, first, as the number of edge lines (bending lines) increases as described above, the stiffness and the strength of the overlap portions of the pillars 3 and the roof arches 4 can be increased. Further, as a plurality of the closed cross-sectional portions 13 and a plurality of the stop portions 16 are provided, a load applied to the stop portions 16A, 16B can be dispersed when the side curtain airbag expands. The respective stop portions 16A, 16B can be correspondingly downsized. Accordingly, the area of the closed cross-sectional portions 13 can be prevented from becoming large so that the degree of freedom of layout of the pillar beads 7 and the roof beads 10 is increased, while it is not necessary to provide opening portions for moving off to avoid interference with the stop portions 16A, 16B. It is possible to correspondingly maintain the stiffness and the strength of the overlap portion of the pillar 3 and the roof arch 4.

A preferable embodiment according to the present invention has been described above. Although, in the above described embodiment, a pillar 3 was made a center pillar, the pillar 3 can also be applied to other pillars such as a rear pillar. Further, an embodiment in which the pillar beads 7 and the roof beads 10 protrude to the interior side of the vehicle compartment has been described, the pillar beads 7 and the roof beads 10 may protrude to the exterior side of the vehicle compartment. Still further, the present invention is not limited to the structure described in the drawings, and various design modifications can be made.

DESCRIPTION OF REFERENCE SYMBOLS

1: vehicle body structure
2: roof side rail

3: pillar
4: roof arch
7: pillar bead
10: roof bead
13: closed cross-sectional portion
14A-14C: spot welding portion (joint portion)
15: pillar garnish
16: stop portion

The invention claimed is:

1. A vehicle body structure comprising:
a left-right pair of roof side rails extending in a front-rear direction of a vehicle body;
a pillar extending in an upper-lower direction, an upper end of the pillar being joined to an interior side surface of a corresponding roof side rail;
a pillar garnish covering an interior side surface of the pillar; and
a roof arch extending in a vehicle transverse direction, left and right side end portions thereof being joined to interior side surfaces of the roof side rails,
wherein the pillar includes a pillar bead extending in the upper-lower direction and protruding from an interior to an exterior of a vehicle compartment,
wherein the roof arch includes a roof bead extending in the left-right direction and protruding from the interior to the exterior of the vehicle compartment,
wherein the pillar and the roof arch are joined with each other such that the pillar bead is overlapped with the roof bead in the interior-exterior direction of the vehicle compartment,
wherein the roof arch is joined to the interior side surface of the pillar,
wherein the roof bead is arranged such that a protruding amount thereof to an interior side of the vehicle compartment is set larger than a protruding amount of the pillar bead to the interior side of the vehicle compartment,
wherein the roof bead is overlapped with the interior side surface of the pillar bead so that a closed cross-sectional portion is formed between the roof bead and the pillar bead, and
wherein the pillar garnish includes at an upper end thereof a stop portion that is stopped by being inserted into the closed cross-sectional portion.

2. The vehicle body structure according to claim 1, wherein a plurality of the pillar bead and a plurality of the roof bead are provided at a certain interval in the front-rear direction of the vehicle body, and each pillar bead and each roof bead are disposed so as to overlap each other in the interior-exterior direction of the vehicle compartment.

3. The vehicle body structure according to claim 1, wherein joint portions are provided each of which joins the pillar and the roof arch such as to sandwich the pillar bead and the roof bead in the front-rear direction of the vehicle body.

4. The vehicle body structure according to claim 3, wherein each joint portion includes a spot welding portion for three pieces that are the corresponding roof side rail, pillar, and roof arch.

5. The vehicle body structure according to claim 1,
wherein a plurality of the pillar bead, a plurality of the roof bead, and a plurality of the stop portion are provided at a certain interval in the front-rear direction of the vehicle body,
wherein the pillar beads are overlapped with corresponding roof beads respectively in the interior-exterior direction of the vehicle compartment to thereby form a plurality of the closed cross-sectional portions, and
wherein respective stop portions are stopped by being inserted into corresponding closed cross-sectional portions.

* * * * *